United States Patent [19]

Sunakawa et al.

[11] Patent Number: 5,835,921
[45] Date of Patent: Nov. 10, 1998

[54] DATA PROCESSING APPARATUS FOR CREATING AND STORING A TEXT FILE FROM INPUT DATA

[75] Inventors: Shinichi Sunakawa; Yoshiyuki Endoh, both of Yokohama, Japan

[73] Assignee: Canon Kabushiki Kaisha, Tokyo, Japan

[21] Appl. No.: 312,940

[22] Filed: Sep. 30, 1994

Related U.S. Application Data

[63] Continuation of Ser. No. 675,335, Mar. 26, 1991, abandoned.

[30] Foreign Application Priority Data

Mar. 29, 1990 [JP] Japan .................................. 2-78767
Feb. 19, 1991 [JP] Japan ................................. 3-024332

[51] Int. Cl.⁶ ..................................................... G06F 17/22
[52] U.S. Cl. ......................... 707/518; 707/519; 707/521
[58] Field of Search .......................... 395/600, 144–151; 364/419.1, 419.17; 400/61–69, 70–78, 98, 279; 707/517–523, 531, 539, 513

[56] References Cited

U.S. PATENT DOCUMENTS

| | | | |
|---|---|---|---|
| 3,893,558 | 7/1975 | Fulton et al. | 395/108 |
| 4,240,075 | 12/1980 | Bringol | 340/798 |
| 4,357,680 | 11/1982 | Greek, Jr. et al. | 364/900 |
| 4,393,463 | 7/1983 | Aiken, Jr. | 364/900 |
| 4,459,049 | 7/1984 | Howell et al. | 400/98 |
| 4,470,129 | 9/1984 | Dislnow et al. | 395/148 |
| 4,604,710 | 8/1986 | Amezcua et al. | 364/900 |
| 4,679,952 | 7/1987 | Hirota et al. | 400/279 |
| 4,831,583 | 5/1989 | Pascoe | 364/900 |
| 4,881,197 | 11/1989 | Fischer | 395/600 |
| 4,916,656 | 4/1990 | Sasaki | 364/900 |
| 4,931,987 | 6/1990 | Kawakami | 364/900 |
| 4,984,162 | 1/1991 | Torii et al. | 364/518 |
| 5,003,499 | 3/1991 | Fujiwara et al. | 395/146 |
| 5,151,975 | 9/1992 | Shiraki et al. | 395/153 |
| 5,287,538 | 2/1994 | Kawakami et al. | 395/800 |
| 5,290,109 | 3/1994 | Midorikawa | 400/68 |
| 5,359,708 | 10/1994 | Bloomer et al. | 395/148 |

FOREIGN PATENT DOCUMENTS

| | | |
|---|---|---|
| 293238 | 11/1988 | European Pat. Off. . |
| 315957 | 5/1989 | European Pat. Off. . |
| 337068 | 10/1989 | European Pat. Off. . |
| 59-223833 | 12/1984 | Japan . |
| 60-222270 | 11/1985 | Japan . |
| 1009744 | 4/1989 | Japan . |
| 1-321555 | 12/1989 | Japan . |

OTHER PUBLICATIONS

Acerson, Karen, *WordPerfect Series 5 Edition: The Complete Reference*, 1988, pp. 3–7, 67–72, 76, 80–97, 136–139, 142–155, 162–163, 166–175, 206–212, 504–510, 790–795, 837–838, 955–961.

Digest of Papers. Spring Compcon '82. 24th IEEEE Computer Society International Conference. 22–25 Feb. 1982, San Francisco, CA. US, pp. 332–336, R. Gruisti, "A Professionals Tools of the Trade: The HP125 Business Assistant".

*Primary Examiner*—Joseph H. Feild
*Attorney, Agent, or Firm*—Fitzpatrick, Cella, Harper & Scinto

[57] ABSTRACT

A data processing apparatus for inputting character data and for creating and storing a text file includes an input unit for inputting characters, a discriminating unit for discriminating an attribute of the leading character of the character string input by the input unit, a format modifying unit for modifying a format of the character string in accordance with the result of the discrimination made by the discriminating unit, and an output unit for outputting the character string which has been modified by the format modifying unit.

37 Claims, 14 Drawing Sheets

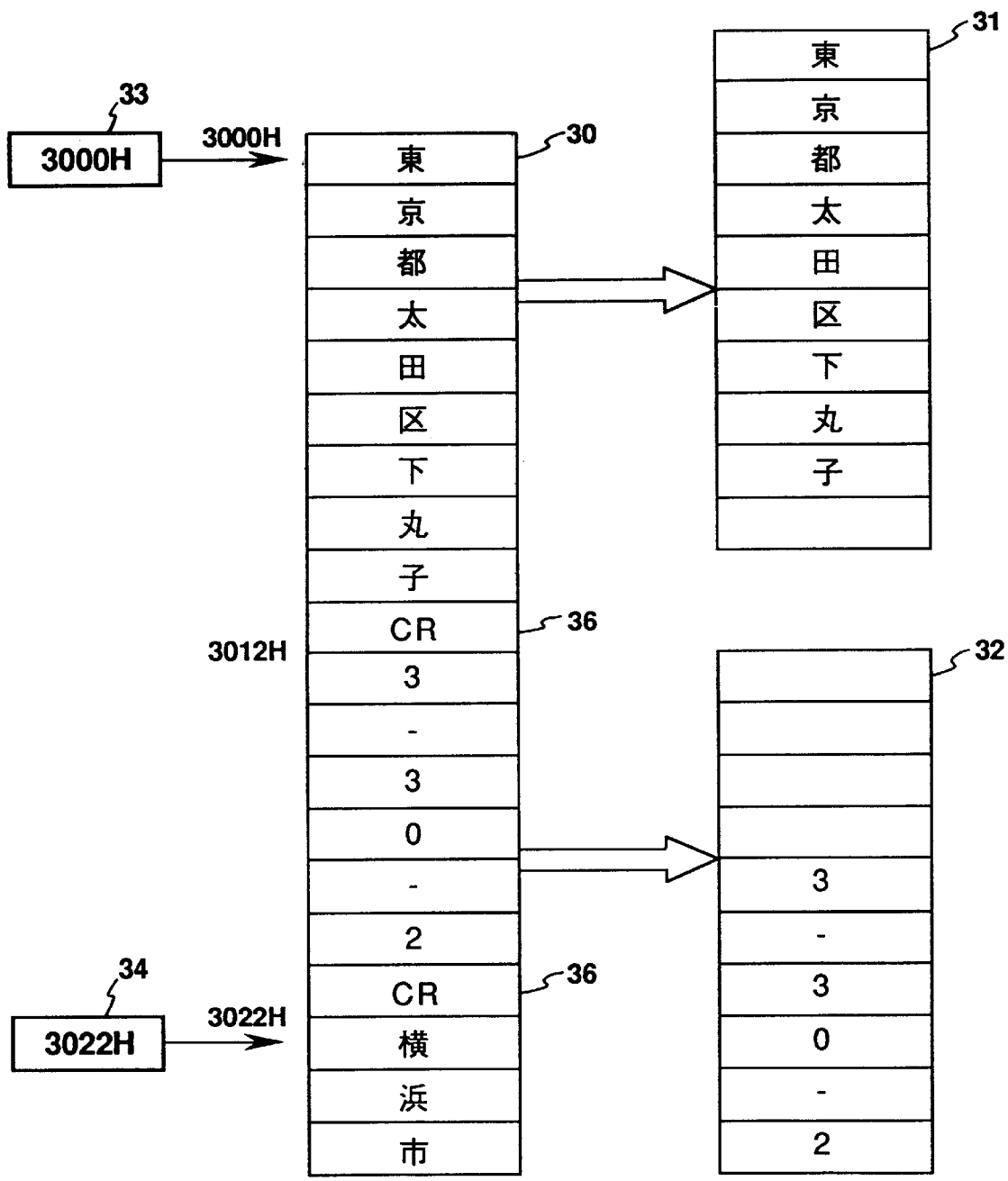
F I G. 4

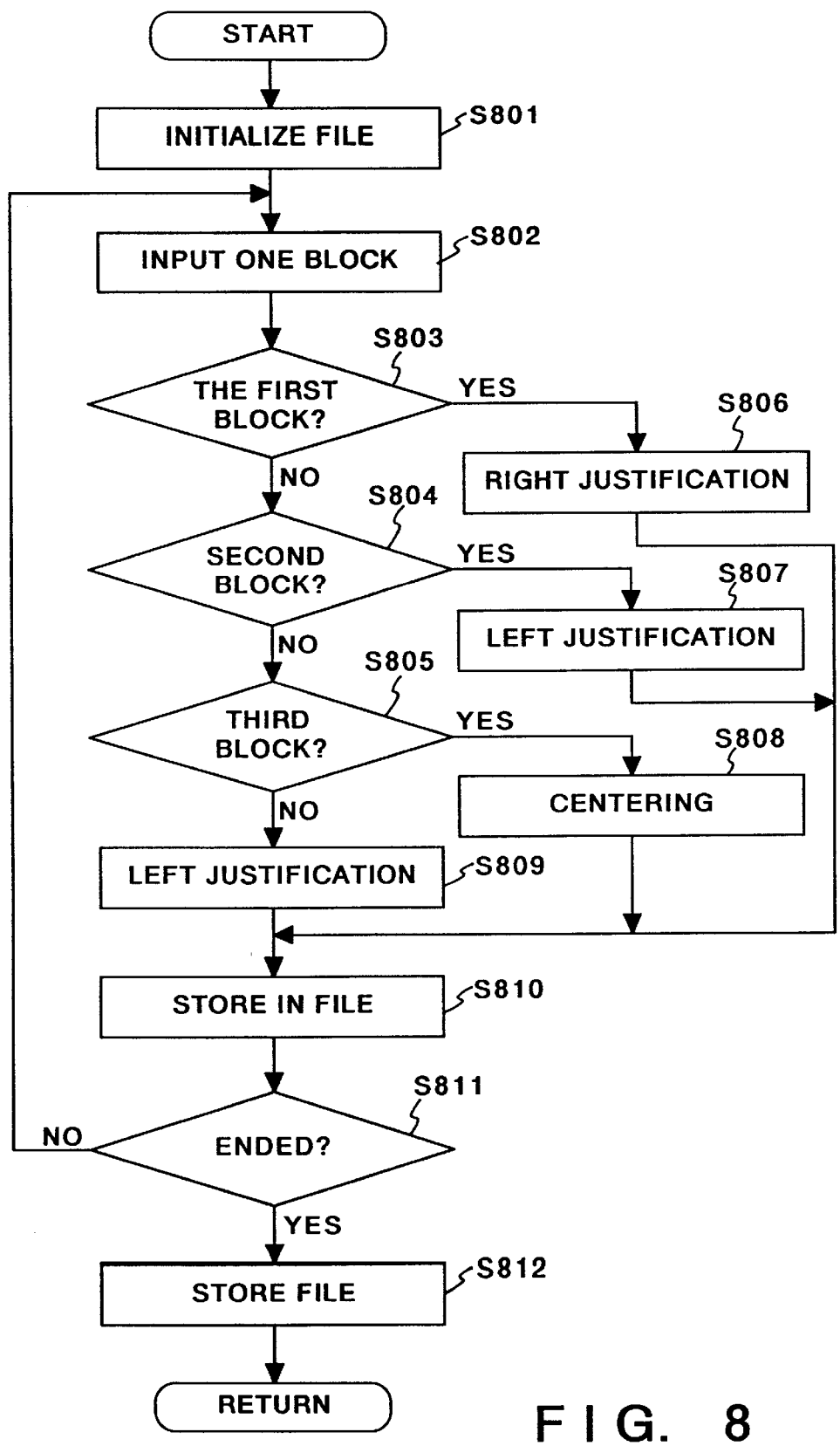
F I G. 8

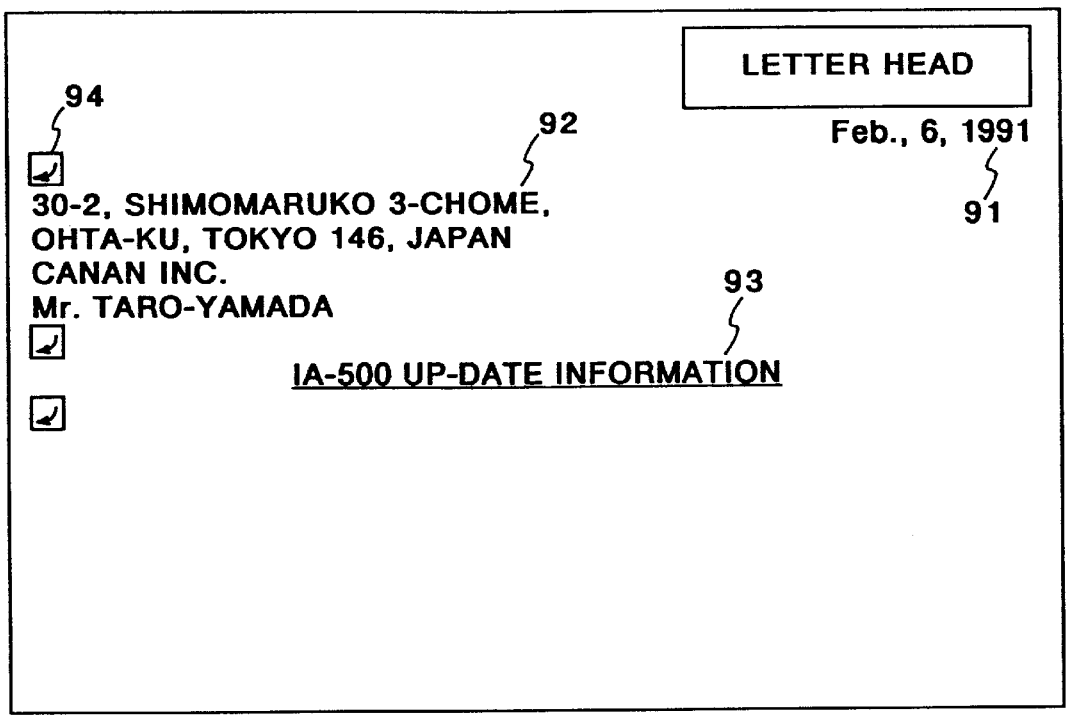
F I G. 10A
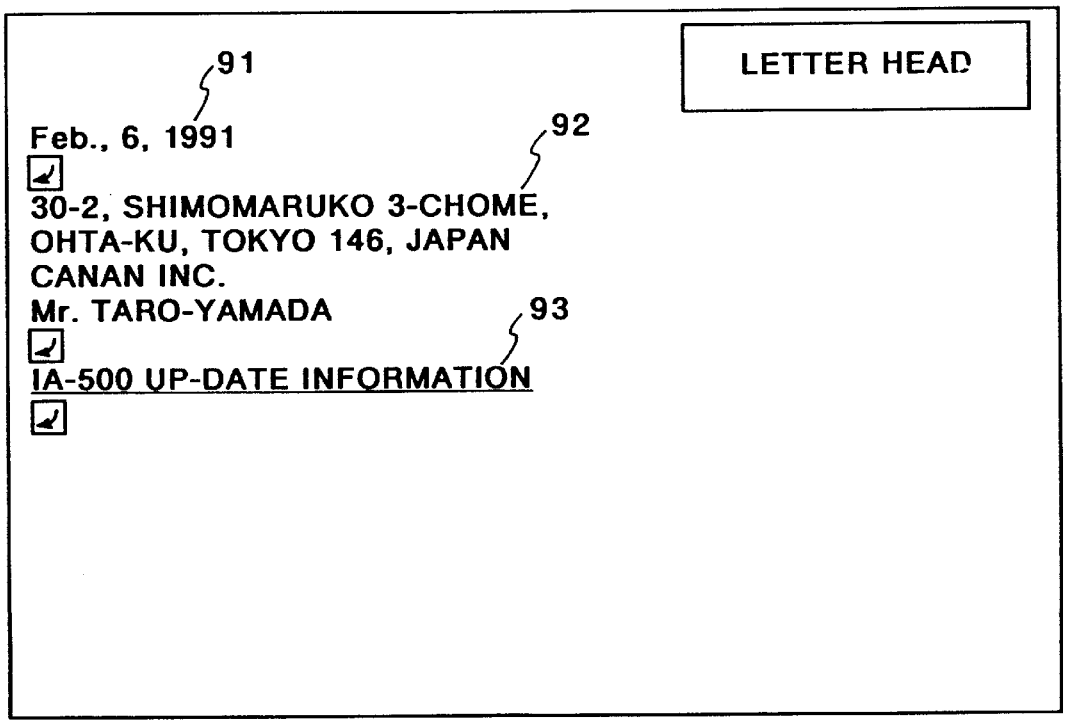
F I G. 10B

| BLOCK NO. | LAYOUT |
|---|---|
| 1 | RIGHT JUSTIFICATION |
| 2 | LEFT JUSTIFICATION |
| 3 | CENTERING |
| 4 | LEFT JUSTIFICATION |
| E O T | |

F I G. 11

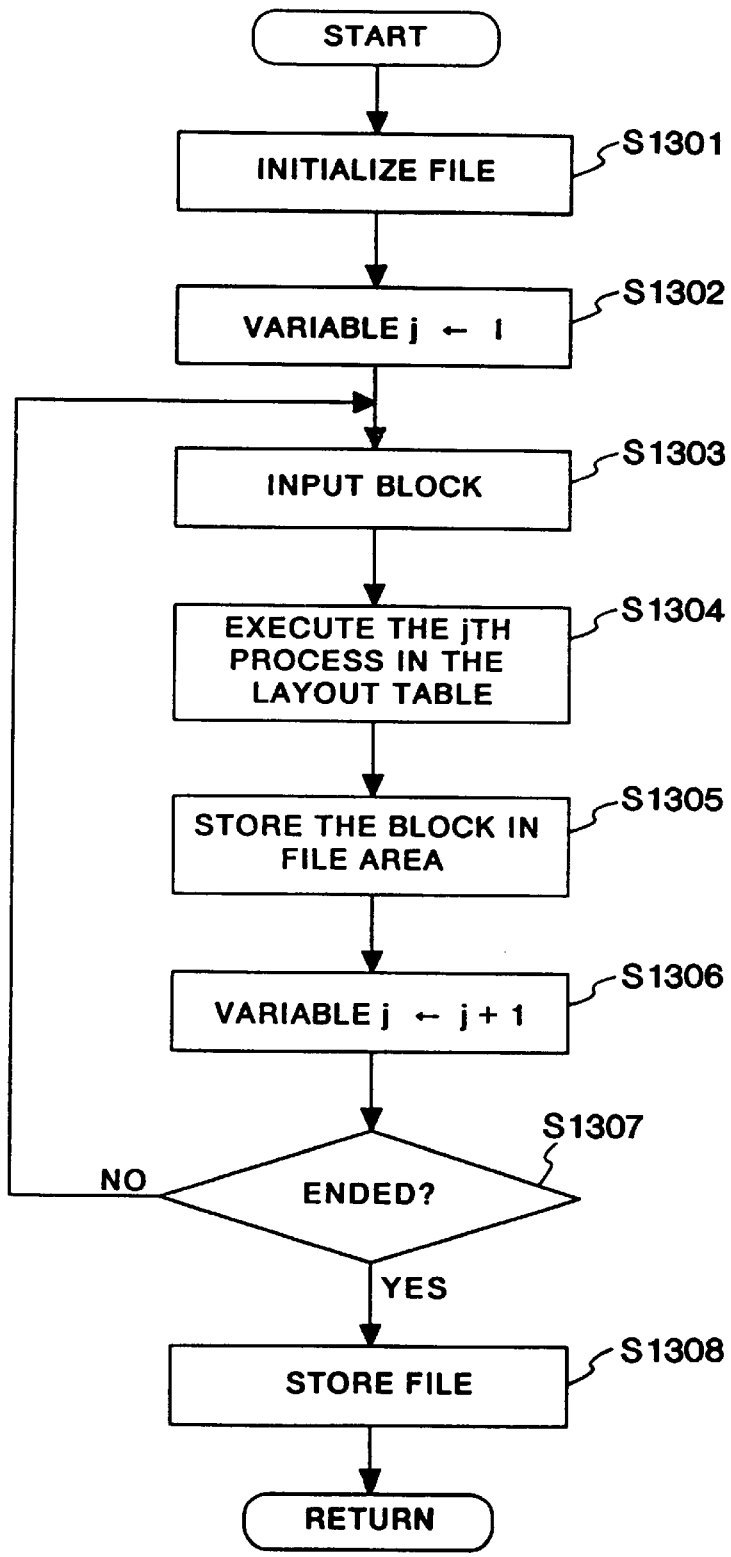
F I G. 13

DATA PROCESSING APPARATUS FOR CREATING AND STORING A TEXT FILE FROM INPUT DATA

This application is a continuation of application Ser. No. 07/675,335, filed Mar. 26, 1991, now abandoned.

BACKGROUND OF THE INVENTION

The present invention relates to a data processing apparatus, and more particularly, to a data processing apparatus which is capable of inputting character data having a plurality of attributes to create a data file, and which is capable of outputting that data file when necessary.

When an operator inputs prefecture names, house numbers, etc., into, for example, a word processor or the like to create an address list using the address list creating function thereof, he or she takes into consideration how the data appears when printed on a post card. That is, the operator generally makes a layout of the data using various functions such as the tab and space functions.

Similar processing is conducted when dates, addresses and titles are inputted to create reports or letters.

However, in an case of the address book, the operator must make a layout each time he or she inputs characters. For example, the operator must left justify the character strings representing town names and right justify the figures representing house numbers. This is a very troublesome task.

Also, when reports or letters are created, the operator must take into consideration the layout so that the dates are right justified, destination addresses left justified, and titles centered.

SUMMARY OF THE INVENTION

In view of the aforementioned problems relative to conventional techniques, an object of the present invention is to provide a data processing apparatus which allows an operator to obtain an output in a desired format when he or she inputs characters.

In order to achieve this object, the present invention provides a data processing apparatus for inputting character data and for creating and storing a text file, which comprises input means for inputting characters, discrimination means for discriminating an attribute of the leading character of the character string input by the input means, format modification means for modifying a format of the character string in accordance with the result of the discrimination made by the discrimination means, and output means for outputting the character string which has been modified by the format modification means.

Another object of the present invention is to provide a data processing apparatus which allows an operator to obtain an output in a desired format when he or she inputs characters and which does not allow a created text file to occupy a large part of a memory.

In order to achieve this object, the present invention provides a data processing apparatus for inputting character data and for creating and storing a text file, which comprises, input means for inputting characters, storage means for storing the character string input by the input means for each line, discrimination means for discriminating an attribute of the leading character of the character string stored in the storage means, format modification means for modifying a format of the character string in accordance with the result of the discrimination made by the discrimination means, and output means for outputting the character string modified by the format modification means.

Another object of the present invention is to provide a data processing apparatus which allows an operator to obtain a desired format for each character string block when he or she inputs characters.

In order to achieve this object, the present invention provides a data processing apparatus for inputting character data and creating and storing a text file, which comprises input means for inputting a character string block including a character string at least in one line, format modification means for modifying a format of the character string block input by the input means, and output means for outputting the character string block which has been modified by the modification means.

Another object of the present invention is to provide a data processing apparatus which allows an operator to obtain an output in a desired format previously set for each character block when he or she inputs characters.

In order to achieve this object, the present invention provides a data processing apparatus for inputting character data and for creating and storing a text file, which comprises, setting means for setting a format for each character string block including a character string at least in one line, input means for inputting the character string block, format modification means for modifying a format of the character string in the character string block input by the input means on the basis of the content set by the setting means, and output means for outputting the character string block which has been modified by the format modification means.

Another object of the present invention is to provide a data processing apparatus which allows an operator to modify the format of already input character string blocks in a desired manner.

In order to achieve this object, the present invention is a data processing apparatus for inputting character data and for creating and storing a text file, which comprises, input means for inputting a character string block including a character string at least in one line, storage means for storing the input character string block, setting means for setting a format for each character string block, format modification means for modifying the format of the character string in the character string block stored in the storage means on the basis of the content set by the setting means, and output means for outputting the character string block which has been modified by the format modification means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a block diagram of storage and output of data in a second embodiment of the present invention;

FIG. 8 is a flowchart showing the block data layout processing executed in the third embodiment;

FIG. 10A shows a letter printed in the third embodiment;

FIG. 10B shows a letter printed out by a conventional apparatus;

FIG. 11 shows an example of the content of a layout table used in a fourth embodiment of the present invention;

FIG. 13 is a flowchart explaining the content of the layout processing in the fourth embodiment.

DETAILED DESCRIPTION OF THE PREFERRED EMBODIMENTS

A first embodiment of the present invention will be described with reference to FIGS. 1 to 3 and 6.

<Description of System Configuration>

Figure 1:
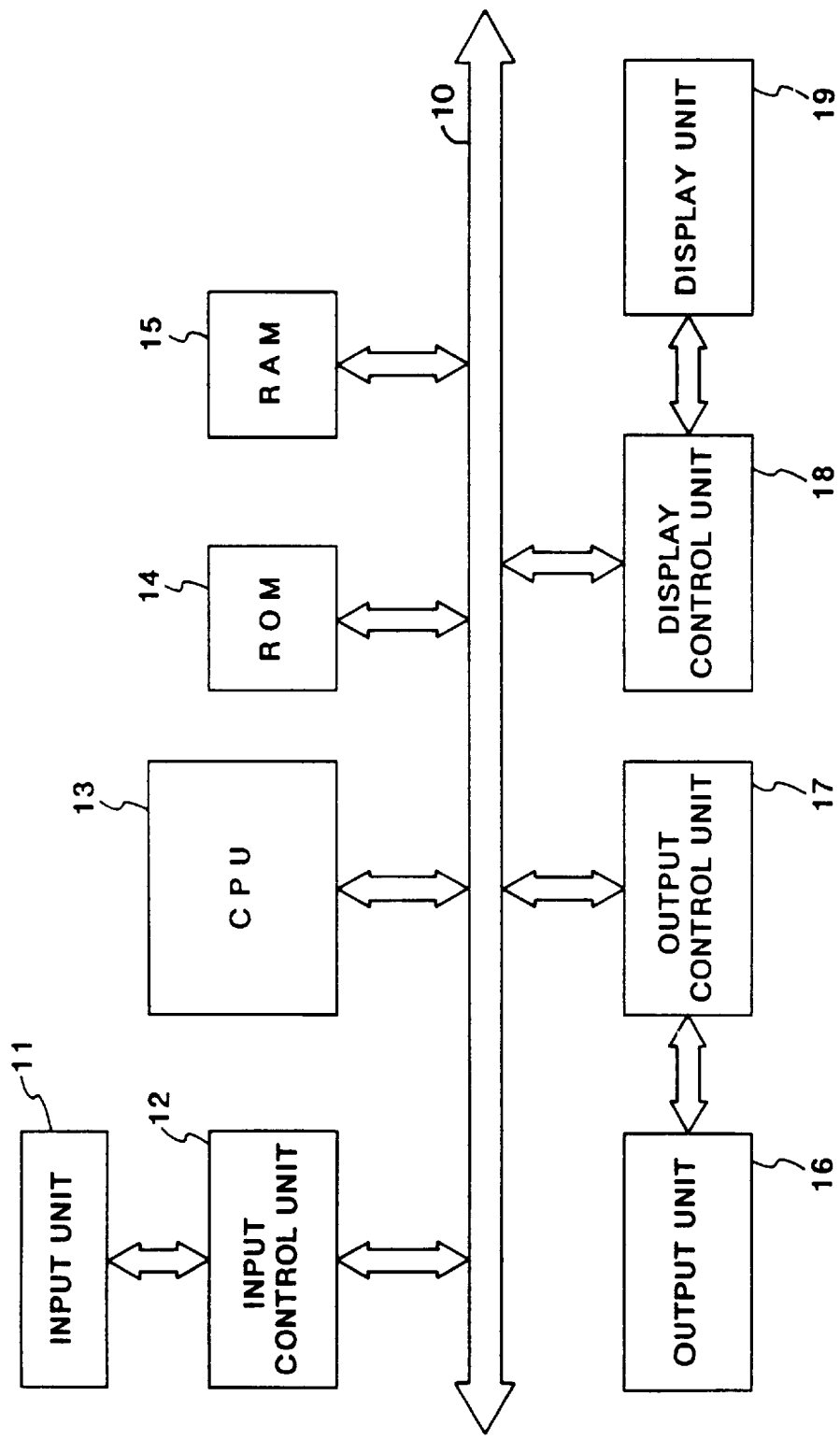
FIG. 1 is a block diagram of a first embodiment of a data processing apparatus according to the present invention.

FIG. 1 is a block diagram of a data processing apparatus. In FIG. 1, a reference numeral 10 denotes a bus line connected to a CPU 13 or to individual control units which will be described later; 11, an input unit for inputting characters which may be a keyboard or RS-232C interface; 12, an input control unit for controlling input of characters from the input unit 11; 13, a CPU for performing the entire operations and controls in accordance with the procedure (program) which will be described later; 14, a ROM which is a memory for storing the programs of the CPU 13; 15, a RAM which is a memory consisting of a work area used when the CPU 13 executes the processing, and an area for storing data such as an address list; 16, an output unit which may be a printer for printing a created address list or storing it as a file, a disk unit or a RS-232C interface; 17, an output control unit for controlling the output unit 16; 18, a display control unit for controlling a display unit 19 which will be described later; and 19, a display unit for displaying the characters input by the input unit 11, and which may be a liquid crystal display or CRT.

<Description of Post Card>

In a country such as Japan, an envelope or a post card is normally addressed by writing a destination address vertically or horizontally from left to right. The address consists of a character string representing the name of a city, town or village, and a character string made up of digits, representing a house number. The former type of character string is followed by the latter type of character string. The address is written in one or two lines. When the address is written in two lines, it is desired that a character string starting with a digit, representing a house number, be written in the second line. In this case, from the viewpoint of providing a fine appearance, it is usual that a character string starting with a digit (a house number) be right justified in a case where the address is written horizontally, and moved so that the last character is at the appropriate end of the envelope or post card in a case where the address is written in vertical lines.

<Description of Address List>

The present embodiment involves the input of character strings forming a destination address to be printed on a post card in a way which conforms to the above-described Japanese custom and the processing conducted thereafter. The character code representing a single letter in the Japanese language is 2 bytes long. Hence, updating of an address by one character means an increase or decrease of 2 bytes.

The flow of processing for storing character data forming an address which is input by an operator from the input unit 11 will be described below with reference to FIG. 2.

In this embodiment, the characters input from the input unit 11 (keyboard) are temporarily stored in an input buffer provided in the RAM 15. The CPU 13 displays the input character string starting with the first character or stores it in an area provided at another address in the RAM 15, as will be described later in detail.

Figure 2A:
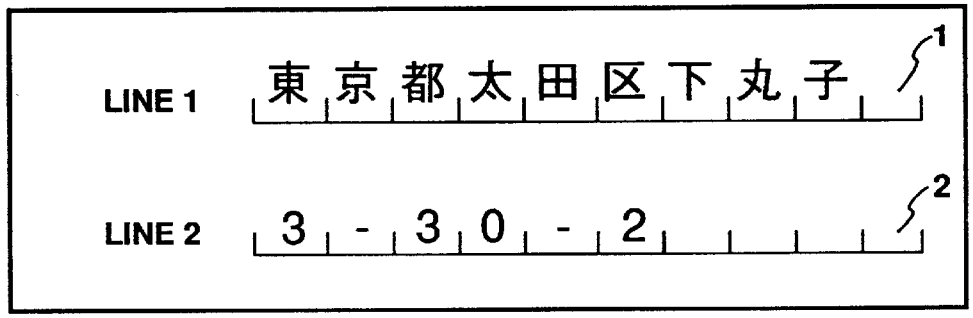
FIGS. 2A to 2C is a diagram of the flow of data in the first embodiment of FIG. 1.

In FIG. 2A, reference numerals 1 and 2 denote the data input by the operator. The data is input over two lines, as shown in FIG. 2A. A character string 1 corresponds to the name of a city, town or village, and a character string 2 corresponds to the house number. In FIG. 2C, reference numerals 5 and 6 denote input buffers provided in the RAM 15. FIG. 2C shows how the character strings 1 and 2 are stored in the input buffers 5 and 6. The end of the data on the input buffer 5 is indicated by a pointer 8. The readout beginning of the data stored in the input buffer 5 is indicated by a pointer 9. A reference numeral 7 denotes a storage for an address. A plurality of storages 7 are provided in the RAM 15 so that a plurality of addresses can be stored in the same format.

The characters input from the input unit 11 are stored in the input buffer 5 in the form of a character code, as stated above. The characters are stored in the input buffer 5 at an address indicated by the pointer 8. When the storage is completed, the pointer 8 is updated for the input of a subsequent character.

The CPU 13 fetches the character codes starting from the character stored at an address indicated by the pointer 9 to display or store them at the storage 7 provided on the RAM 15. Each time one character is fetched, the pointer 9 is updated. Thus, the pointer 9 eventually catches up with the pointer 8. When this happens, the input buffer 5 is empty.

In an initialized state, both the pointers 8 and 9 are indicating the leading address of the input buffer 5. As a character is input, it is stored in the buffer 5 at an address indicated by the pointer 8, and the pointer 8 is then updated by one character. As the input buffer is limited, updating of the pointer 8 which is memorizing the ending address of the input buffer causes the pointer 8 to memorize the leading address of the input buffer.

FIG. 2C shows the state in which a 'carriage return', signifying the end of the input, has been input, i.e., the state in which the respective input data are stored in the address storage 7.

Figure 2B:
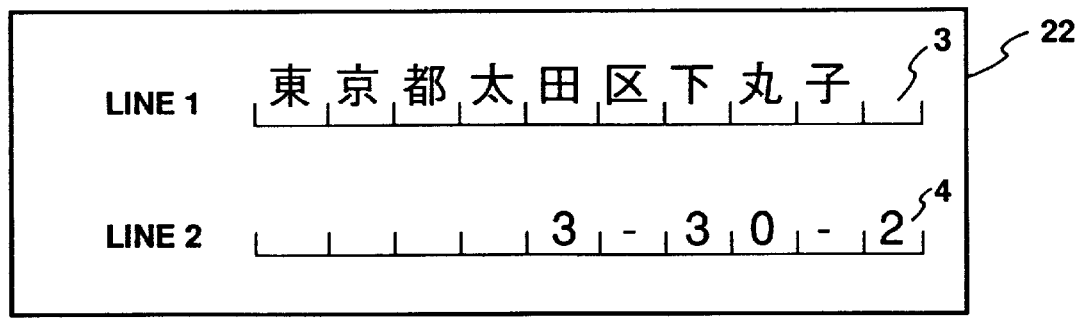
Figure 2C:
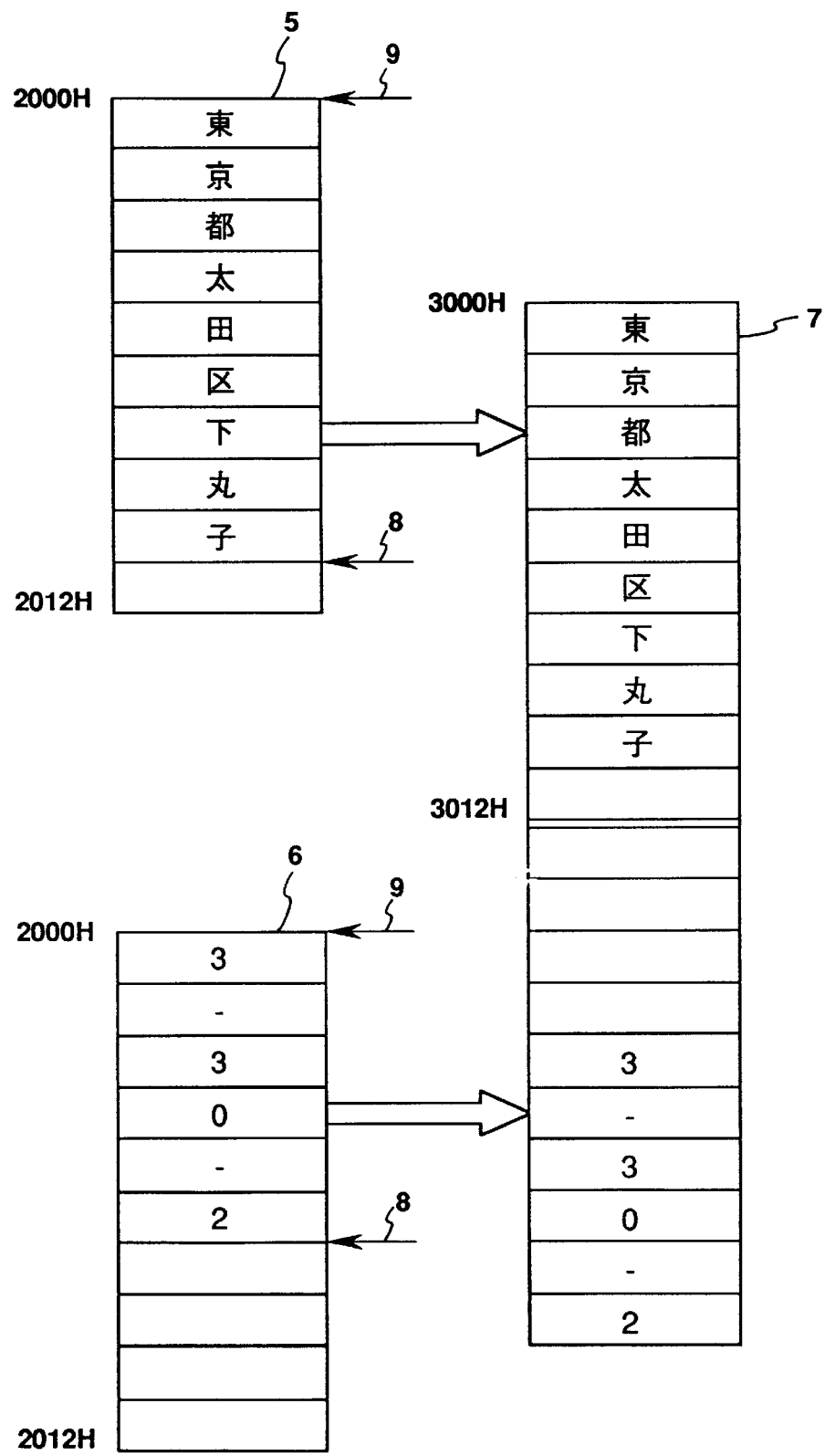

FIG. 2B shows the results of the output of the data stored in the address list to the output unit (printer or the like) 16 or to the display unit 19. A character string 3 corresponds to the character string 1 shown in FIG. 2A, and a character string 4 corresponds to the character string 2.

In this embodiment, the data input in the manner shown in FIG. 2A is stored in the form shown in FIG. 2B in which the digit portion thereof is right justified, this being achieved by the insertion of spaces at the beginning of the character data.

<Description of Procedures>

Figure 3:
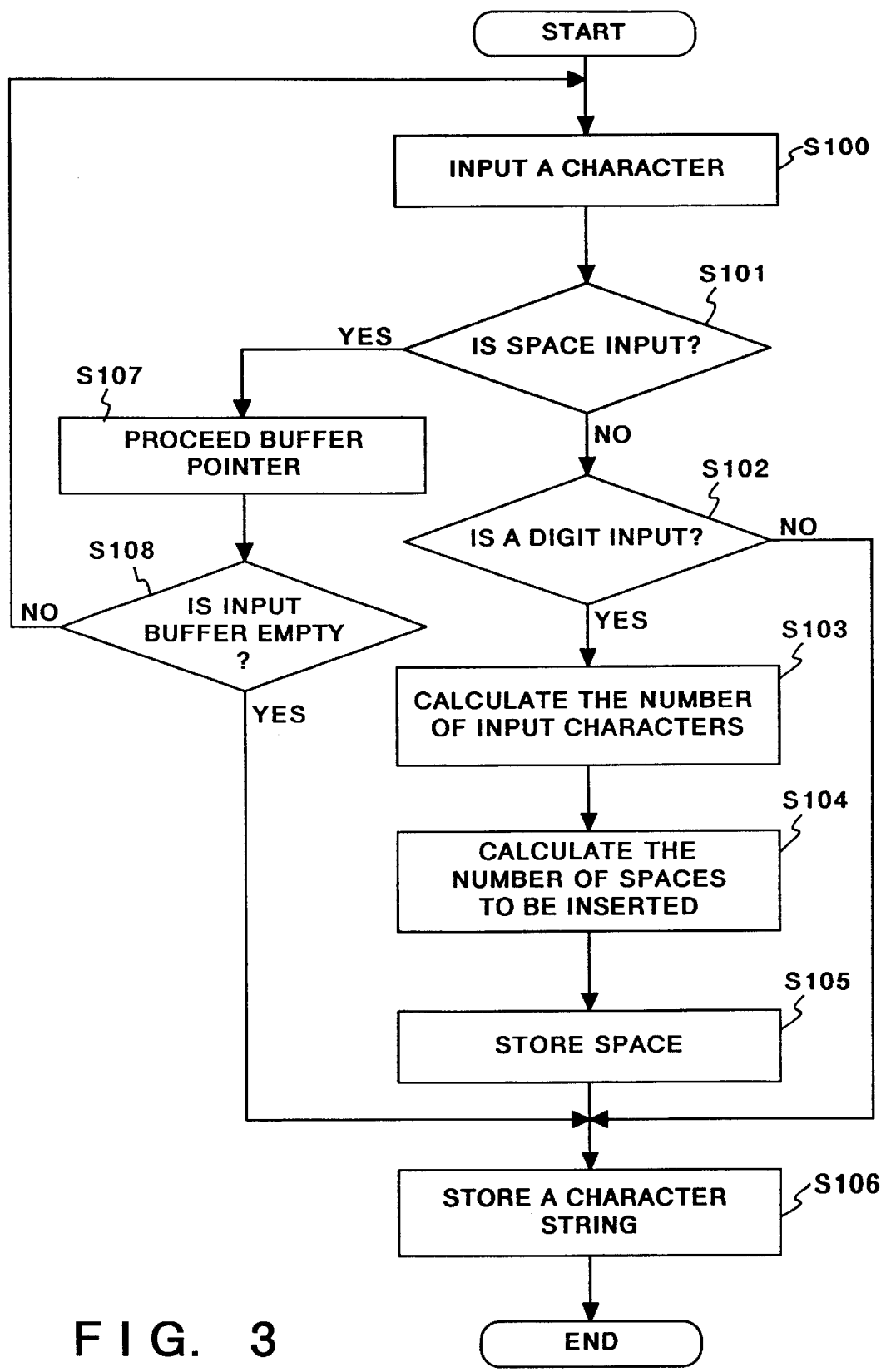
FIG. 3 is a flowchart showing the data storage processing executed in the first embodiment.

Next, the procedures executed by the CPU 13 to store the data in the aforementioned address list will be described below with reference to the flowchart of FIG. 3.

This flowchart shows the process of storing the characters, input from the input unit 11 through the input control unit 12, in the address storage 7. This processing is executed after all the characters have been stored in the input buffer 5.

First, in step S100, the leading character in the input buffer 5 is fetched by referring to the pointer 9 shown in FIG. 2C, and then in step S101, it is determined whether or not the character is a space. If it is a space, the process goes to step S107, and the pointer 9 is advanced by one character. Thereafter, in step S108, it is determined whether or not data remains in the input buffer 5. If the input buffer 5 is empty, the process goes to step S106, and the empty character string is stored in the address storage 7, thereby completing the process.

If it is determined in step S108 that data remains in the input buffer 5, the process returns to step S100 and the above-described series of processes are repeated.

When the space(s) located at the beginning of the line have been removed by the above-described series of processes and the leading character has been fetched, it is determined in step S102 whether or not that character is a digit. If the character is not a digit, the process goes to step S106 and the content in the input buffer 5 between the character currently indicated by the read-out pointer 9 and a subsequent carriage return code is stored in the address storage 7, thereby completing the process. However, if it is determined in step S102 that the input character is a digit, the number of characters stored in the input buffer 5 between that digit and a subsequent carriage return code is calculated in step S103.

Thereafter, in step S104, a number of spaces to be inserted is calculated by subtracting 'the number of characters' obtained in step S103 from 'the number of characters per line'. The operator sets the number of characters per line before he or she inputs characters. Subsequently, in step S105, spaces are stored in the address storage 7 according to the number of spaces obtained in step S104, and then the character string in the input buffer 5 is stored in the address storage 7 in step S106 starting with the character indicated by the pointer 9. At that time, the character string consists of the previously obtained number of characters. This completes the process.

Figure 6B:
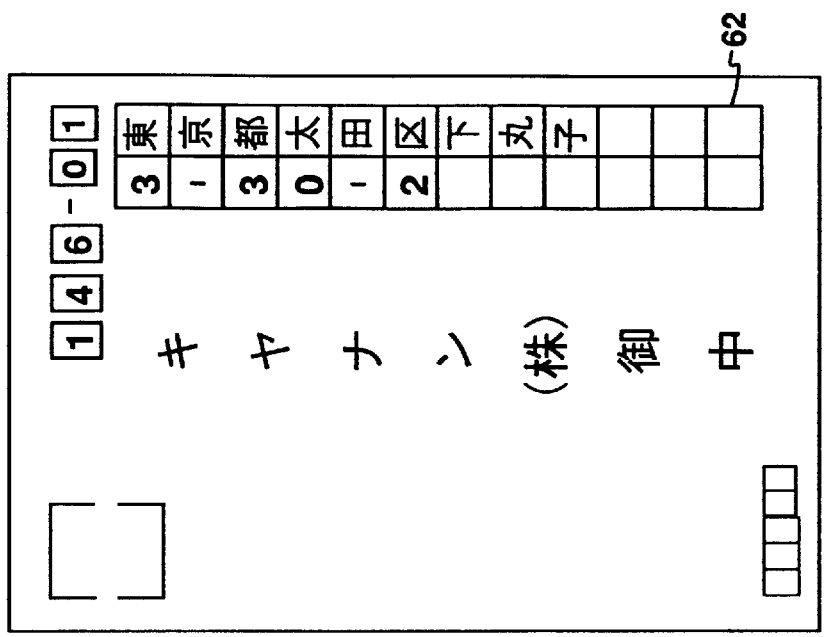
FIG. 6B shows a post card printed by a conventional apparatus.
Figure 6A:
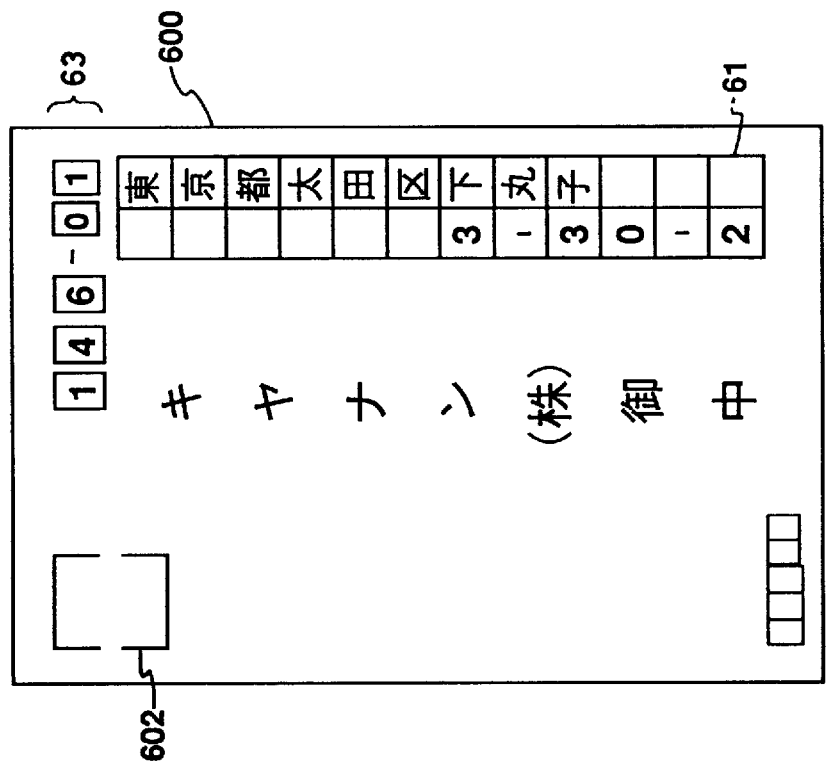
FIG. 6A shows a post card printed in the first embodiment of the present invention.

FIG. 6A shows the results of the output of the characters which have been subjected to the aforementioned series of processes on a post card. In FIG. 6A, numeral 63 denotes zip code. In this example, the destination address is written in vertical lines. FIG. 6B shows the results of the output of characters from a general apparatus which are input without the layout taken into consideration. In the output example shown in FIG. 6B, the house number is printed out such that the beginning thereof is located at the upper end of an address column 62. In contrast, the house number is printed out such that the end thereof is located at the lower end of an address column 61 in the output example shown in FIG. 6A, although the input operation is the same as that conducted in the example shown in FIG. 6B. That is, the characters are laid out in a natural way, as if they are hand written.

As will be clear from the foregoing description, it is possible according to the present embodiment to provide a data processing apparatus having the function of printing addresses in an address list on post cards in a good layout, that is, the function of conducting right justification only when the beginning character of a line is a digit. This function is handy.

<Description of Second Embodiment>

A second embodiment of the present invention will now be described with reference to FIGS. 4 and 5.

Whereas data is processed when it is input in the preceding embodiment, data is processed when it is displayed or output in this embodiment.

The configuration of the apparatus in this embodiment is the same as that shown in FIG. 1, with the detailed description being omitted.

FIG. 4 shows the state of data which has been subjected to the processing of this embodiment. In FIG. 4, a reference numeral 30 denotes an address storage secured in the RAM 15; 33 and 34, pointers for indicating the leading address of the address data; 36, the delimiter of data (CR); and 31 and 32, a state in which the address data is output in the second embodiment.

Figure 5:
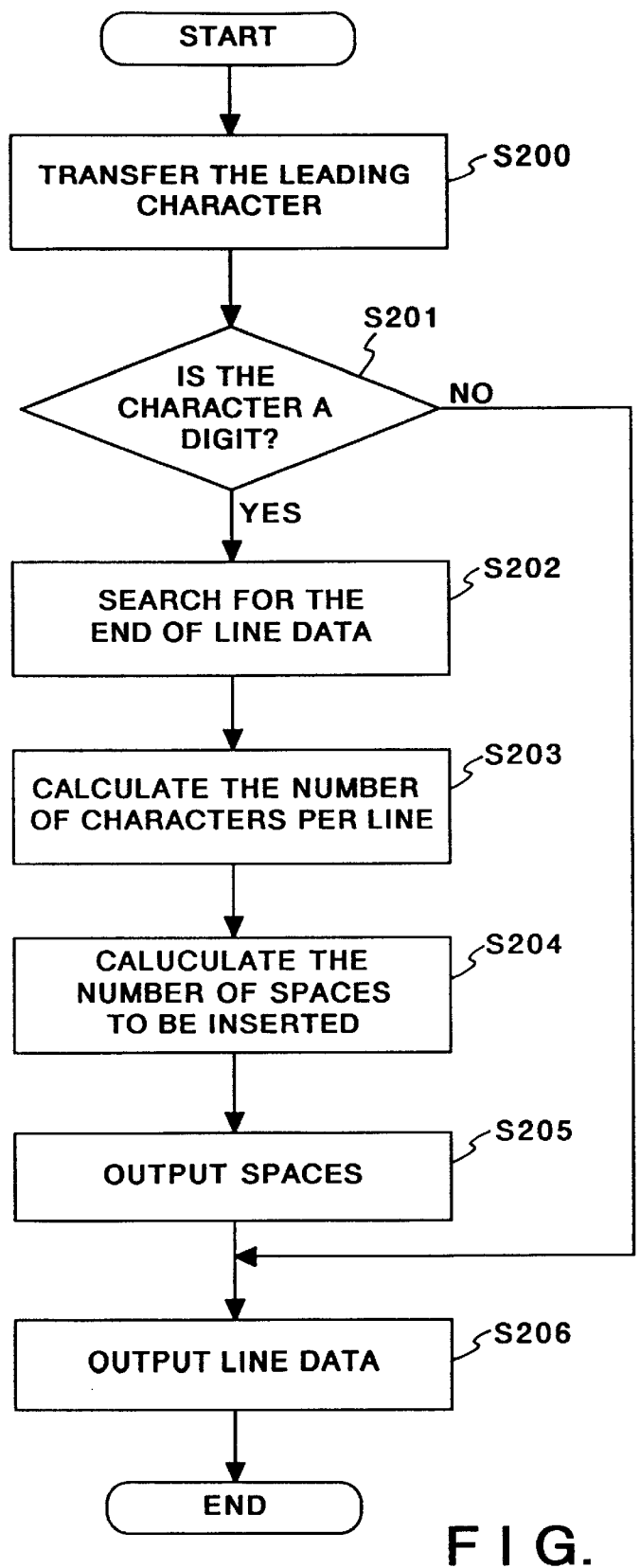
FIG. 5 is a flowchart showing the data output processing executed in the second embodiment.

FIG. 5 is a flowchart showing the procedures of the second embodiment. The output process will be described below with reference to FIG. 5.

First, in step S200, the leading character of character data 30 is fetched, and it is then determined in step S201 whether or not that character is a digit. If the character is not a digit, the process goes to step S206, and normal line data is output to the output unit 16 through the output control unit 17, thereby completing the process.

If it is determined in step S201 that the character is a digit, the process goes to step S202, and the delimiter 36 for indicating the end of the line in which that digit is present is searched for. Thereafter, in step S203, the number of characters in the objective line is calculated, and then in step S204, the number of spaces to be inserted is calculated by subtracting 'the number of characters' obtained in step S203 from 'the number of characters per line'. Subsequently, in step S205, spaces are output to the output unit 16 according to the number of spaces calculated in step S204. Next, in step S206, the data for one line (the character string consisting of digits) is output to the output unit 16, thereby completing the process.

In this embodiment, it is possible to obtain the same advantage as that of the previously described first embodiment. In addition, the amount of RAM to be used can be reduced because data, excluding spaces, is stored in the RAM. This is advantageous in terms of data compression.

<Description of Third Embodiment>

A third embodiment of the present invention will be described below with reference to FIGS. 7 to 10B.

In the aforementioned first and second embodiments, the process is executed when the character input at the beginning of a line is a digit. In the third embodiment, empty lines are detected when character strings are input, and the portion of a sentence, consisting of a character string located between two empty lines, is regarded as a block. Layout or the like is made on the block in accordance with the turn in which that block is input. The third embodiment shows the case in which a letter is created in English. In this case, it is assumed that a character string representative of data is input in the first character string block, that a character string representative of a destination address is input in the second character string block, that a character string representing a headline is input in the third character string block, and that the body of a letter is input in the fourth character string block. The configuration of the apparatus is the same as that of the apparatus shown in FIG. 1, with a description thereof being omitted. It is however to be noted that an area for storing a carriage return flag and a text file consisting of the aforementioned blocks is secured at a predetermined address of the RAM 15.

Figure 7:
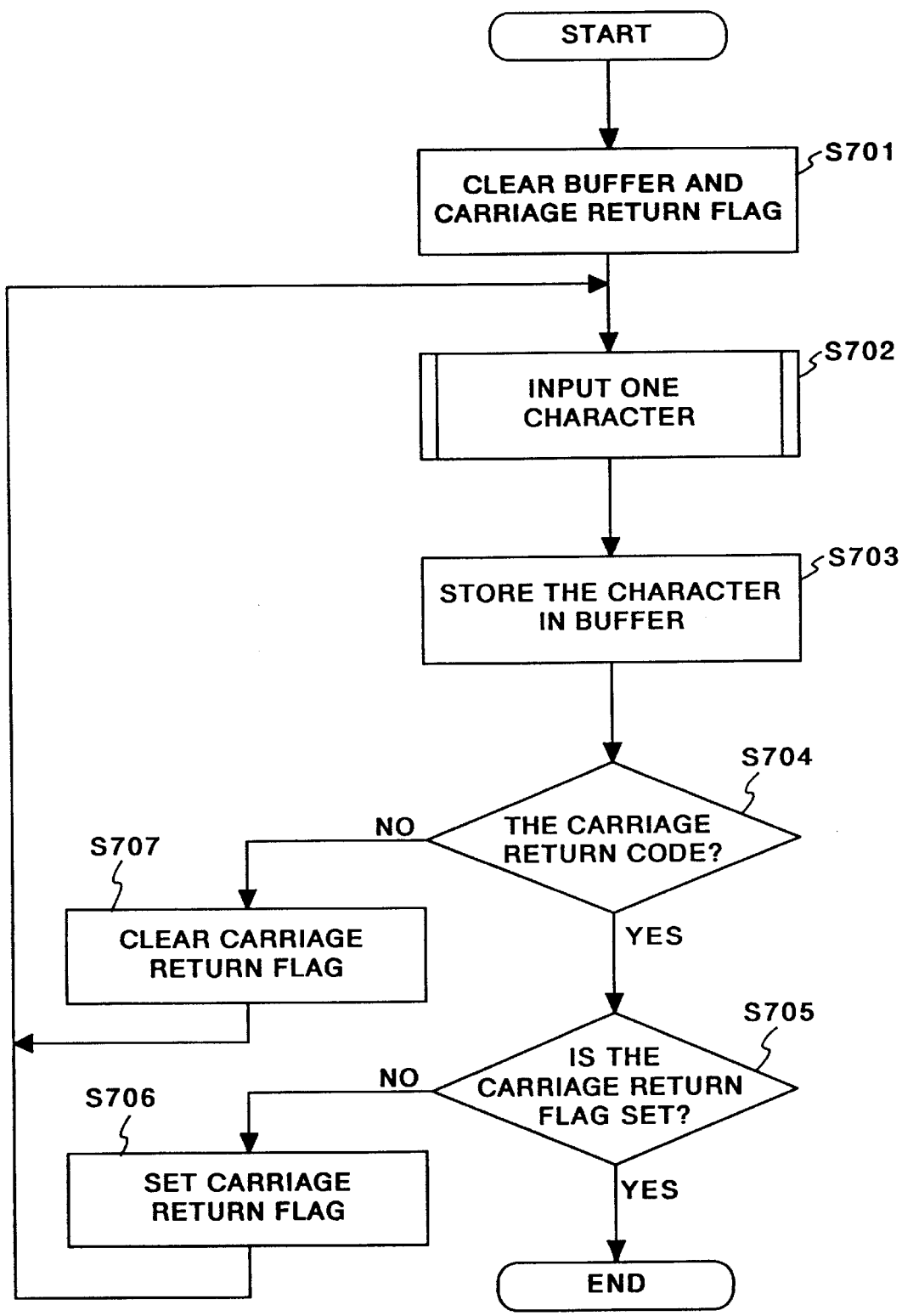
FIG. 7 is a flowchart showing the input data blocking processing executed in a third embodiment of the present invention.

The procedures of separating the input lines into blocks using empty lines will be described with reference to FIG. 7.

First, prior to the input of characters, the input buffer 5 and a carriage return flag are cleared in step S701. Thereafter, in step S702, one character is input from the input unit 11, and the input data (character code) representing one character is then stored in the input buffer 5 in step S703. Thereafter, it is determined in step S704 whether or not the stored character code is a carriage return code. If the stored character code is not a carriage return code, that is, if it is a normal character code, the carriage flag is cleared in step S707, and then the process returns to step S702. That is, the carriage return flag is kept cleared while the character codes excluding the carriage return codes are stored in the input buffer 5 in sequence.

If it is determined in step S704 that the stored character code is a carriage return code, the process goes to step S705 and it is determined whether or not the carriage return flag is set. If the carriage return flag is not set, the carriage return flag is set in step S706, and then the process returns to step S702. If it is determined in step S705 that the carriage return flag is set, it is determined that input of the character string constituting one block has been completed, and the process returns to the main routine.

In other words, it is determined in step S705 that the carriage return flag is set only when the carriage return code is input consecutively two times, because the carriage return flag which has been set by the input of one carriage return code is cleared in step S702 when the character code input subsequent to the carriage return code is a character code other than the carriage return code. The operator presses a carriage return key in order to move the character input position to the beginning of a subsequent line. Hence, the cursor signifying the character input position moves to the beginning of a subsequent line by the input of a first carriage return code. The successive input of another carriage return code further moves the cursor to the beginning of another subsequent line. This means that one empty line is input by the operator.

As stated above, the input processing of one character string block ends when the two carriage return codes are input in succession. For the input of a subsequent character string block, the procedures shown in FIG. 7 are repeated again.

Figure 9:
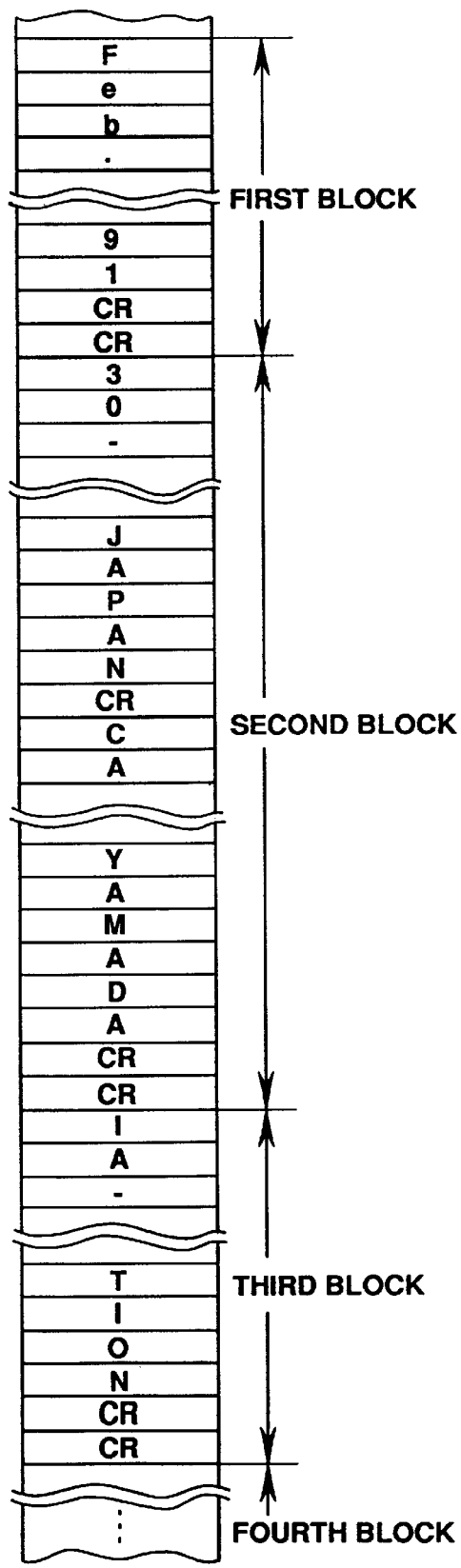
FIG. 9 shows an example of the content of an input buffer in the third embodiment.

While a plurality of blocks are input, the procedures of making a layout of the input blocks are executed in accordance with the flowchart shown in FIG. 8. To simplify description, it is assumed that a plurality of characters (character codes) have already been input in the input buffer 5, as shown in FIG. 9.

First, in step S801, an area for storing a text file is secured in the RAM 15, and the paper size or line spacing is initialized. Next, in step S802, the input buffer 5 is searched for non-fetched blocks. If there exists non-fetched blocks, the leading block is fetched. To determine the break between the blocks, it is determined whether or not two carriage return codes (CR) are stored in succession.

Once the single block has been fetched, the block's turn is determined in steps S803 to S805.

If it is determined that the fetched block is the first block, the process goes to step S806 and right justification is executed. That is, the character string block is moved to the right on a sheet of paper by inserting tab or space codes in advance of the character string present in that block on the basis of the line width information in the format information set in step S801.

If it is determined that the fetched block is the second block, the process goes to step S807 and left justification is executed on the character string present in that block. Normally, sentences are left justified. Therefore, nothing is actually done in step S807.

If it is determined that the fetched block is the third block, the character string present in that block is centered in step S808. In the centering process, tab or space codes are inserted in advance of the character string so that the center thereof is located at the center of the line width.

If the fetched block is the fourth or subsequent block, left justification is done in step S809.

Once the layout process has been done on the character string present in the block, the process goes to step S810 and the information on the processed block is stored in the file area secured in the RAM 15.

The aforementioned series of processings are repeated until it is determined in step S811 that an 'ending' key (not shown) provided in the input unit 11 (keyboard) is pressed.

If it is determined in step S811 that the 'ending' key has been pressed, the data stored in the RAM 15 is stored in an external memory unit (not shown) as one file in step S812.

FIG. 10A shows an example of print out of the text file which has been subjected to the aforementioned series of processes. For comparison, FIG. 10B shows an example of print out of the text file which has not been subjected to the layout process of the third embodiment.

As is clear from FIGS. 10A and 10B, all the blocks, including a date block 91, an address block 92, and a headline block 93, are left justified in the example shown in FIG. 10B, whereas in FIG. 10A, the blocks are arranged in a similar layout to that of the hand writing, although the input operation is the same as that conducted for the example shown in FIG. 10B. That is, the data block 91 is right justified, the address block 92 is left justified, and the headline block 93 is centered.

As will be clear from the foregoing description, in the third embodiment, the empty lines are detected so that the portion located between the two empty lines is made one block, and a layout is made on that block in accordance with the turn in which that block is input. It is therefore possible to provide a data processing apparatus which is handy and which is capable of creating a document in a natural layout.

In the above-described third embodiment, the processing shown in FIG. 8 is executed when a certain amount of character strings has been input in the input buffer 5. However, the processing shown in FIG. 8 may be executed parallel to the character input processing. In that case, an interrupt signal may be output to the CPU 13 each time a block is key input (alternatively, at predetermined time intervals) in the character input processing. The CPU 13 stores the character codes input in the interrupt routine in the input buffer 5.

<Description of Fourth Embodiment>

In the aforementioned third embodiment, the layout of the sentences determined beforehand is used. It is however, desirable that the operator can freely set the layout when he or she inputs sentences. Therefore, the fourth embodiment shows the case in which the operator can freely set the layout. In this embodiment, the break between the blocks is set by inputting the carriage return code two times in succession, as in the case of the third embodiment.

The fourth embodiment will be outlined below.

The operator sets the layout of each block prior to the input of characters. The set layout information is stored in the RAM 15 in a tabular form (this table hereinafter being referred to as a layout table), such as that shown in FIG. 11. In FIG. 11, 'EOT' is a control code which signifies the end of the layout table. The CPU 13 determines that no data exits subsequent to 'EOT' when it detects 'EOT'. For a fifth or subsequent block, the layout information set immediately before 'EOT' is used. This is the same as the third embodiment. Once the layout table has been created, the operator inputs the character string blocks from the input unit 11. The input character strings are processed in accordance with the layout table in blocks.

Figure 12:
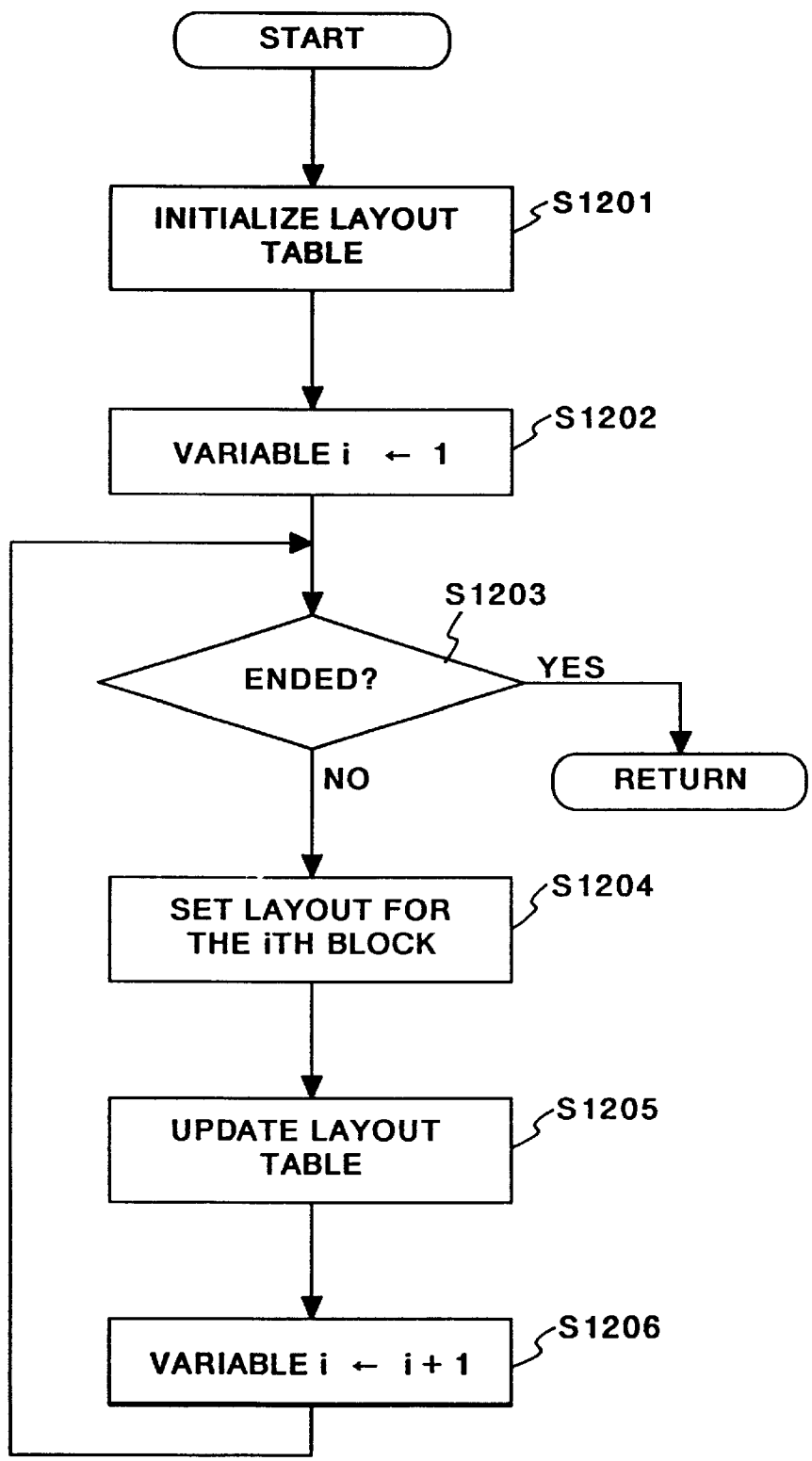
FIG. 12 is a flowchart explaining the content of the layout setting processing.

The procedures executed by the CPU 13 to implement the above-described processing will be described below with reference to FIGS. 12 and 13. The program for implementing this processing is stored in the ROM 14. However, it may also be loaded in the RAM 15 from an external storage unit.

First, when a key (not shown) associated with the setting of the layout is pressed, the process of step S1201 is executed, that is, the layout table is secured in the RAM 15, and the layout table is cleared. Next, in step S1202, a variable 'i' is secured in the RAM 15, and '1' is assigned to the variable as the initial value. Next, it is determined in step S1203 whether or not the key associated with the end of setting of the layout is pressed. Here, it is assumed that such a key is not pressed.

Next, in step S1204, the layout of the block indicated by the variable 'i' is set. This may be done, for example, by displaying on the display unit 19 a message which says, 'set the layout for the first block' if the variable 'i' indicates '1', and by displaying at the same time the layout items that can be set in a menu so that the operator can select one of the items.

Once the layout for the block indicated by the variable 'i' has been set, the content of the variable 'i' and the set layout information are stored in the layout table in step S1205. Thereafter, the variable 'i' is incremented, and the process then returns to step S1203.

Thus, the operator sets the layout for each block in a desired way. Once it is determined in step S1203 that the key signifying the end of the setting is pressed, 'EOT' is attached to the end of the layout table, and the process the returns to the main routine.

Next, the processing of editing the layout for each block on the basis of the input character string will be described with reference to FIG. 13. This processing corresponds to the processing shown in FIG. 8, which is executed in the third embodiment.

First, in step S1301, the area for storing a text file is secured in the RAM 15, and the conditions related to the format, such as the paper size and line spacing, are set. Next, in step S1302, a variable 'j' is secured at a predetermined position in the RAM 15, and '1' is assigned to the variable 'j' as the initial value.

Next, in step S1303, the input buffer 5 is searched for non-fetched blocks. If there exists non-fetched blocks, the leading block is fetched. Thereafter, in step S1304, the jth layout information of the previously created layout table is examined, and the layout of the fetched block is made on the basis of the layout information. This process may be executed first by determining the type of layout information and then by executing either of the processes of step S806 to S807 on the basis of the results of the determination.

Thereafter, in step S1305, the block on which layout has been made is stored in the file area in the RAM 15. Next, in step S1306, the variable 'j' is incremented, and then it is determined in step S1307 whether or not the end key is pressed. The processes of step S1303 and the subsequent steps are repeated until it is determined that the end key is pressed If it is determined in step S1307 that the end key has been pressed, the data stored in the file area in the RAM 15 is stored in an external storage unit in step S1308, thereby completing the process.

As stated above, in the fourth embodiment, the operator sets the layout for the document which he or she is going to input. Thereafter, the operator can create documents having the set layout by inputting character strings.

In the aforementioned first to fourth embodiments, the layout made on each input block has been described. However, the present invention is not limited to this. For example, underlining of the character string of a desired block or a change in the character size or type may be designated. The text is created in accordance with the designated contents. Alternatively, a plurality of conditions may be designated for a single block, e.g., right justification and underlining of the first block may be designated. This is achieved by securing an area for storing a plurality of information on one block in the layout table.

Furthermore, the character string representing the date alone is generally right justified irrespective of the Japanese or European languages. Hence, a table of words used for the date block, such as 'Jan' and 'Feb', may be provided in the ROM 14, so that the character string or block which starts with any character string stored in that table can be regarded as the date block. In that case, when data (blocks), including the date, address and headline blocks, are input, the date in the input blocks can be right justified.

In the third and fourth embodiments, the break between the blocks is indicated by the consecutive input of two carriage return codes. However, a 'block separator' key may be provided in the input unit 11, such as a keyboard, so that the break between the blocks can be indicated by the input of that key.

Furthermore, the layout processing is executed on the character string which is currently input. However, the layout processing may be executed after all the character strings have been input. That is, the operator inputs character strings without taking the layout into consideration, stores than in the file area and then presses a predetermined key to execute the layout processing. This is implemented by reading out the block in step S802 shown in FIG. 8 and in step S1303 shown in FIG. 13 not from the input buffer 5 but from the file area.

Furthermore, a plurality of types of layout tables may be registered in an external storage unit. The operator selects one of these tables, by which the selected table is read in the RAM 15, and then inputs character strings. In this way, setting of the layout can be eliminated when documents having the same layout are created.

In the above embodiments, printing of indicia on a record surface has been described. However, the invention is also applicable to the display of indicia on a display screen.

As many apparently widely different embodiments of the present invention can be made without departing from the spirit and scope thereof, it is to be understood that the invention is not limited to the specific embodiments thereof except as defined in the appended claims.

What is claimed is:

1. A character data processing apparatus comprising:

input means for inputting a plurality of lines, each of which being composed of characters, the plurality of lines being stored in one memory block, and wherein the lines stored in the one memory block are capable of being addressed and output to a predetermined portion of a memory using one address pointer;

discrimination means for discriminating a type of leading character in each line of the plurality of lines stored in the memory block;

layout determination means for determining a layout, in the predetermined portion, of the leading character of each line in the memory block in accordance with the discriminated type of leading character; and output means for outputting the leading character of each line to the predetermined portion based on the layout determined by said layout determination means.

2. The character data processing apparatus according to claim 1, wherein said layout determination means modifies a character string in each line into the form of output desired.

3. The character data processing apparatus according to claim 2, wherein said form in which the character string is output includes the type of font, an underline and character size.

4. The character data processing apparatus according to claim 1, wherein said layout determination means includes layout means for modifying the arrangement of each character line.

5. The character data processing apparatus according to claim 4, wherein said discrimination means discriminates whether the leading character of each character line is a digit or not.

6. The character data processing apparatus according to claim 4, wherein said input means is adapted to input characters which constitute an address.

7. The character data processing apparatus according to claim 4, wherein said layout means is adapted to insert space or tab codes immediately before each leading character of the character line on which discrimination is made by said discrimination means.

8. The character data processing apparatus according to claim 4, wherein said layout determination means is adapted to insert spaces or tabs immediately before the leading character of each character line so that the last character in the character line can be located at the end of a lines when said discrimination means discriminates that the leading character in is a digit.

9. The data processing apparatus according to claim 1, wherein said output means is a display device.

10. The data processing apparatus according to claim 1, wherein said output means is a printer.

11. The character data processing apparatus according to claim 1, wherein said output means is a communication interface.

12. The character data processing apparatus according to claim 1, wherein said layout determination means modifies an output position of each leading character to be formatted in a line in which the leading character is to be outputted.

13. A data processing apparatus which input character data, formats the character data, and creates and stores a text file, comprising:

input means for inputting a document comprising a plurality of character string blocks each including at least one character string and predetermined delimiters;

discrimination means for discriminating the character string blocks by detecting the delimiters between the character string blocks;

layout determination means for determining a layout of each character string block, which is discriminated by said discrimination means, in accordance with a predetermined format, if a leading character of the discriminated character string block is a predetermined type of character; and output means for outputting each leading character based on the layout determined by said layout determination means.

14. The data processing apparatus according to claim 13, wherein said layout determination means modifies the form in which the character string in each character string block is output.

15. The data processing apparatus according to claim 14, wherein said form includes the type of font, and underline and character size.

16. The data processing apparatus according to claim 13, wherein said layout determination means includes layout means for modifying the arrangement of each character string block.

17. The data processing apparatus according to claim 16, wherein said layout means is adapted to locate character strings in one character string block by selecting one of right or left justification or centering in accordance with the predefined format for each block.

18. The data processing apparatus according to claim 16, wherein said layout means is adapted to perform centering or right justification by inserting tabs or spaces immediately before the leading character of the character string in each line in the character string block.

19. The data processing apparatus according to claim 13, wherein said input means includes character input means for inputting characters, and separator information input means for inputting a delimiter in order to separate each block.

20. The data processing apparatus according to claim 19, wherein said delimiter comprises a carriage return made twice in succession.

21. The data processing apparatus according to claim 13, wherein said output means is a display device.

22. The data processing apparatus according to claim 13, wherein said output means is a printer.

23. The data processing apparatus according to claim 13, wherein said output means is a communication interface.

24. The data processing apparatus according to claim 13, wherein said layout determination means modifies the output position of the leading character to be formatted in a line in which that leading character is to be outputted.

25. A character data processing method comprising:

an input step of inputting a plurality of lines, each of which being composed of characters, the plurality of lines being stored in one memory block, and wherein the lines stored in the one memory block are capable of being addressed and output to a predetermined portion of a memory using one address pointer;

a discrimination step of discriminating a type of leading character of each line of the plurality of lines stored in the one memory block;

a layout determination step of determining a layout, in the predetermined portion, of the leading character of each stored line in accordance with the discriminated type of each leading character; and an output step of outputting the leading character of each line to the predetermined portion based on the layout determined in said layout determination step.

26. The character data processing method according to claim 25, wherein in said output step a display device is employed.

27. The data processing method according to claim 25, wherein in said output step, a printer is employed.

28. The data processing method according to claim 25, wherein in said output step, a communication interface is employed.

29. The character data processing method according to claim 25, wherein said layout determination step includes modifying an output position of each leading character to be formatted in a line in which that leading character is to be outputted.

30. A data processing method for inputting character data and creating and storing a text file, comprising:

an input step of inputting a document comprising a plurality of character string blocks each including at least one character string and predetermined delimiters;

a discrimination step of discriminating the character string blocks by detecting the delimiters between the character string blocks;

a layout determination step of determining a layout of each character string block, which is discriminated in said discrimination step, in accordance with a predetermined format, if a leading character of the discriminated character string block is a predetermined type of character; and an output step of outputting each leading character based on the layout determined in said layout determination step.

31. The data processing method according to claim 30, wherein in said output step, a display device is employed.

32. The data processing method according to claim 30, wherein in said output step, a printer is employed.

33. The data processing method according to claim 30, wherein in said output step, a communication interface is employed.

34. The data processing method according to claim 30, wherein said layout determination step includes modifying the output position of the leading character to be formatted in a line in which that leading character is to be outputted.

35. A computer program product comprising a computer usable medium having computer readable program code means embodied in said medium, said product including:

input process procedure codes for inputting a plurality of lines, each of which being composed of characters, the plurality of lines being stored in one memory block, and wherein the lines stored in the one memory block are capable of being addressed and output to a predetermined portion of a memory using one address pointer;

discrimination process procedure codes for discriminating a type of leading character in each line of the plurality of lines stored in the one memory block;

layout determination process procedure codes for determining a layout, in the predetermined portion, of the leading character of each stored line in accordance with the discriminated type of each leading character; and output process procedure codes for outputting the leading character of each line to the predetermined portion based on the layout determined by said layout determination process.

36. The computer program product according to claim 35, wherein said layout determination process procedure codes includes determining an output position of each leading character to be formatted in a line in which that leading character is to be outputted.

37. A computer program product comprising a computer usable medium having computer readable program code means embodied in said medium, said product including:

input process procedure code for inputting a document comprising a plurality of character string blocks each including at least one character string and predetermined delimiters;

discrimination process procedure code for discriminating the character string blocks by detecting the delimiters between the character string blocks;

layout determination process procedure code for determining a layout of each character string block, which is discriminated by said discrimination process, in accordance with a predetermined format, if a leading character of the discriminated character string block is a predetermined type of character; and output process procedure code for outputting each leading character based on the layout determined by said layout determination process.

* * * * *

UNITED STATES PATENT AND TRADEMARK OFFICE
CERTIFICATE OF CORRECTION

PATENT NO. : 5,835,921

DATED : November 10, 1998

INVENTOR(S): SHINICHI SUNAKAWA ET AL.

It is certified that error appears in the above-identified patent and that said Letters Patent is hereby corrected as shown below:

TITLE PAGE:

[56] REFERENCES CITED

Foreign Patent Documents
  "1009744" should read --1-009744--.

COLUMN 1

Line 24, "an" should read --the--; and "the" (first
      occurrence) should read --an--.

COLUMN 5

Line 32, "a" should read --the--.

COLUMN 7

Line 58, "exists" should read --exist--.

COLUMN 9

Line 47, "process the" should read --process--.
   Line 62, "exists" should read --exist--.

COLUMN 10

Line 9, "pressed" should read --pressed.--.
   Line 50, "than" should read --them--.

UNITED STATES PATENT AND TRADEMARK OFFICE
CERTIFICATE OF CORRECTION

PATENT NO. : 5,835,921

DATED : November 10, 1998

INVENTOR(S) : SHINICHI SUNAKAWA ET AL.

It is certified that error appears in the above-identified patent and that said Letters Patent is hereby corrected as shown below:

COLUMN 11

```
Line 47, "lines" should read --line,--.
Line 49, "in" should be deleted.
Line 51, "The" should read --The character--.
Line 52, "The" should read --The character--.
Line 61, "input" should read --inputs--.
```

COLUMN 13

```
Line 4, "The" should read --The character--.
Line 6, "The" should read --The character--.
```

Signed and Sealed this

Twenty-third Day of November, 1999

*Attest:*

Q. TODD DICKINSON

*Attesting Officer*  *Acting Commissioner of Patents and Trademarks*